United States Patent
Zhao et al.

(10) Patent No.: US 10,243,687 B2
(45) Date of Patent: Mar. 26, 2019

(54) OPTICAL NETWORK UNIT WAVELENGTH TUNING

(71) Applicant: Google Inc., Mountain View, CA (US)

(72) Inventors: Xiangjun Zhao, Fremont, CA (US); Cedric Fung Lam, San Carlos, CA (US); Shuang Yin, Mountain View, CA (US); Changhong Joy Jiang, Dublin, CA (US); Ke Dong, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/354,811

(22) Filed: Nov. 17, 2016

(65) Prior Publication Data
US 2018/0139006 A1    May 17, 2018

(51) Int. Cl.
*H04J 14/02*    (2006.01)
*H04Q 11/00*    (2006.01)

(52) U.S. Cl.
CPC ...... *H04J 14/0295* (2013.01); *H04J 14/0246* (2013.01); *H04J 14/0249* (2013.01); *H04Q 11/0067* (2013.01); *H04J 2014/0253* (2013.01); *H04Q 2011/0081* (2013.01); *H04Q 2011/0083* (2013.01)

(58) Field of Classification Search
CPC combination set(s) only.
See application file for complete search history.

(56) References Cited

U.S. PATENT DOCUMENTS

| | | | |
|---|---|---|---|
| 8,014,481 B1 * | 9/2011 | Chiang | H04L 7/0338 370/332 |
| 2011/0236017 A1 * | 9/2011 | Ohlen | H04J 14/0282 398/34 |

(Continued)

FOREIGN PATENT DOCUMENTS

| | | |
|---|---|---|
| EP | 2850759 A1 | 3/2015 |
| WO | 2012143046 A1 | 10/2012 |

OTHER PUBLICATIONS

International Search Report and Written Opinion for the related application No. PCT/US2017/053176 dated Jan. 4, 2018.

*Primary Examiner* — David C Payne
*Assistant Examiner* — Omar S Ismail
(74) *Attorney, Agent, or Firm* — Honigman Miller Schwartz and Cohn LLP

(57) ABSTRACT

A method of establishing communication between an optical line terminal and an optical network unit within an optical access network includes receiving a signal indication from an optical transceiver of an optical line terminal. The signal indication includes: (i) a loss-of-signal indication indicating non-receipt of an upstream optical signal from the optical network unit; or (ii) a signal-received indication indicating receipt of the upstream optical signal from the optical network unit. The method includes determining whether the signal indication includes the loss-of-signal indication. When the signal indication includes the loss-of-signal indication, the method includes instructing the optical transceiver to cease signal transmission from the optical transceiver to the optical network unit. Moreover, when the signal indication includes the signal-received indication, the method includes instructing the optical transceiver to transmit a downstream optical signal from the optical transceiver to the optical network unit.

12 Claims, 8 Drawing Sheets

(56) References Cited

U.S. PATENT DOCUMENTS

| | | | | |
|---|---|---|---|---|
| 2013/0004174 A1* | 1/2013 | Lee | ............ | H04J 14/0246 |
| | | | | 398/79 |
| 2013/0336655 A1* | 12/2013 | Grobe | ............ | H04J 14/0246 |
| | | | | 398/67 |
| 2014/0093232 A1* | 4/2014 | Hood | ............ | H04B 10/032 |
| | | | | 398/5 |
| 2015/0055957 A1* | 2/2015 | Lee | ............ | H04J 14/0227 |
| | | | | 398/79 |
| 2015/0131673 A1* | 5/2015 | Sharma | ............ | H04L 49/3072 |
| | | | | 370/419 |
| 2015/0222385 A1 | 8/2015 | Ponzini et al. | | |

* cited by examiner

OPTICAL NETWORK UNIT WAVELENGTH TUNING

TECHNICAL FIELD

This disclosure relates to tuning wavelengths in wavelength division multiplexed (WDM) passive optical networks (PONs).

BACKGROUND

Fiber optic communication is an emerging method of transmitting information from a source (transmitter) to a destination (receiver) using optical fibers as the communication channel. WDM-PON is an optical technology for access and backhaul networks. WDM-PON uses multiple different wavelengths over a physical point-to-multipoint fiber infrastructure that contains passive optical components. The use of different wavelengths allows for traffic separation within the same physical fiber. The result is a network that provides logical point-to-point connections over a physical point-to-multipoint network topology. WDM-PON allows operators to deliver high bandwidth to multiple endpoints over long distances. A PON generally includes an optical line terminal located at a service provider central office (e.g., a hub) and a number of optical network units or optical network terminals, near end users. The optical line terminal may include many optical transceivers paired with the optical network units and assigned a corresponding channel. While the optical transceivers of the optical line terminal may be pre-tuned to their assigned channels for optical communications to the optical network units, the optical network units may need to be tuned to their corresponding assigned channels as well.

SUMMARY

The present disclosure provides systems and methods for establishing communication between an optical line terminal and an optical network unit within an optical access network. According to one aspect, a method includes receiving, at data processing hardware, a signal indication from an optical transceiver of an optical line terminal. The signal indication includes: (i) a loss-of-signal indication indicating non-receipt of an upstream optical signal from the optical network unit; or (ii) a signal-received indication indicating receipt of the upstream optical signal from the optical network unit. The method includes determining, by the data processing hardware, whether the signal indication includes the loss-of-signal indication. When the signal indication includes the loss-of-signal indication, the method includes instructing, by the data processing hardware, the optical transceiver to cease signal transmission from the optical transceiver to the optical network unit. Moreover, when the signal indication includes the signal-received indication, the method includes instructing, by the data processing hardware, the optical transceiver to transmit a downstream optical signal from the optical transceiver to the optical network unit.

Implementations of the disclosure may include one or more of the following optional features. In some implementations, the optical network unit is configured to recursively transmit the upstream optical signal at different wavelengths until receipt of the downstream optical signal. In some examples, the optical network unit is configured to recursively transmit the upstream optical signal at sequentially different wavelengths within a free spectral range. Additionally or alternatively, the optical network unit may be configured to delay transmission of a subsequent upstream optical signal after a prior upstream optical signal by a threshold period of time. The upstream optical signal and the downstream optical signal may have the same or different wavelengths.

Another aspect of the disclosure provides an optical line terminal that includes an optical transceiver, data processing hardware in communication with the optical transceiver, and memory hardware in communication with the data processing hardware. The memory hardware stores instructions that when executed on the data processing hardware cause the data processing hardware to perform operations. The operations include receiving a signal indication from the optical transceiver. The signal indication includes: (i) a loss-of-signal indication indicating non-receipt of an upstream optical signal from the optical network unit; or (ii) a signal-received indication indicating receipt of the upstream optical signal from the optical network unit. The operations include determining whether the signal indication includes the loss-of-signal indication. When the signal indication includes the loss-of-signal indication, the operations include instructing the optical transceiver to cease signal transmission from the optical transceiver to the optical network unit. Moreover, when the signal indication comprises the signal-received indication, the operations include instructing the optical transceiver to transmit a downstream optical signal from the optical transceiver to the optical network unit.

This aspect may include one or more of the following optional features. In some implementations, the optical network unit is configured to recursively transmit the upstream optical signal at different wavelengths until receipt of the downstream optical signal. Additionally or alternatively, the optical network unit may be configured to delay transmission of a subsequent upstream optical signal after a prior upstream optical signal by a threshold period of time. In some examples, the optical network unit is configured to recursively transmit the upstream optical signal at sequentially different wavelengths within a free spectral range. The upstream optical signal and the downstream optical signal may have the same or different wavelengths.

Another aspect of the disclosure provides a method of establishing communication between an optical line terminal and an optical network unit within an optical access network. The method includes instructing, by data processing hardware, an optical transceiver to recursively transmit an upstream optical signal at different wavelengths to an optical line terminal. For each transmitted upstream optical signal, the method includes determining, by the data processing hardware, whether the optical transceiver received a downstream optical signal from the optical line terminal within a threshold period of time. When the optical transceiver received the downstream optical signal from the optical line terminal, the method includes instructing, by data processing hardware, the optical transceiver to cease changing wavelengths of the upstream optical signal.

This aspect may include one or more of the following optional features. In some implementations, instructing the optical transceiver to recursively transmit the upstream optical signal at different wavelengths includes delaying transmission of a subsequent upstream optical signal after a prior upstream optical signal by a threshold delay. Additionally or alternatively, instructing the optical transceiver to recursively transmit the upstream optical signal at different wavelengths includes transmitting the upstream optical signal at sequentially different wavelengths within a free spectral range. The upstream optical signal and the downstream optical signal may have the same or different wavelengths. In some examples, the method includes storing in memory hardware at least one of: (i) the wavelength of the upstream optical signal when the optical transceiver received the downstream optical signal from the optical line terminal; or (ii) the wavelength of the downstream optical signal.

Another aspect of the disclosure provides an optical network unit that includes an optical transceiver, data processing hardware in communication with the optical transceiver, and memory hardware in communication with the data processing hardware. The memory hardware stores instructions that when executed on the data processing hardware cause the data processing hardware to perform operations. The operations include instructing an optical transceiver to recursively transmit an upstream optical signal at different wavelengths to an optical line terminal. For each transmitted upstream optical signal, the operations include determining, whether the optical transceiver received a downstream optical signal from the optical line terminal within a threshold period of time. When the optical transceiver received the downstream optical signal from the optical line terminal, the operations include instructing the optical transceiver to cease changing wavelengths of the upstream optical signal.

This aspect may include one or more of the following optional features. In some implementations, instructing the optical transceiver to recursively transmit the upstream optical signal at different wavelengths includes delaying transmission of a subsequent upstream optical signal after a prior upstream optical signal by a threshold delay. Additionally or alternatively, instructing the optical transceiver to recursively transmit the upstream optical signal at different wavelengths includes transmitting the upstream optical signal at sequentially different wavelengths within a free spectral range. The upstream optical signal and the downstream optical signal may have the same or different wavelengths. In some examples, the operations include storing in memory hardware at least one of: (i) the wavelength of the upstream optical signal when the optical transceiver received the downstream optical signal from the optical line terminal; or (ii) the wavelength of the downstream optical signal.

Another aspect of the disclosure provides a method for establishing communication between an optical line terminal and an optical network unit within an optical access network. The method includes receiving, at data processing hardware, a signal indication from an optical transceiver of an optical line terminal. The signal indication includes a loss-of-signal indication indicating non-receipt of an upstream signal from an optical network unit or a signal-received indication indicating receipt of the upstream optical signal from the optical network unit. The method also includes determining, by the data processing hardware, whether the signal indication includes the loss-of-signal indication. When the signal indication includes the loss-of-signal indication, the method includes instructing, by the data processing hardware, enablement and disablement of the optical transceiver to transmit a downstream optical signal to the optical network unit at a threshold bit rate, resulting in a modulated downstream optical signal including encoded channel information.

This aspect may include one or more of the following optional features. In some implementations, when the signal indication includes the signal-received indication, the method may include instructing, by the data processing hardware, the optical transceiver to continuously transmit the downstream optical signal from the transceiver to the optical network unit according to the channel information. The encoded channel information may include an x-bit long delimiter segment and a y-bit long channel segment.

Yet another aspect of the disclosure provides an optical line terminal including an optical transceiver, data processing hardware in communication with the optical transceiver, and memory hardware in communication with the data processing hardware. The memory hardware stores instructions that when executed on the data processing hardware cause the data processing hardware to perform operations. The operations include receiving a signal indication from the optical transceiver and determining whether the signal indication includes the loss-of-signal indication. The signal indication includes a loss-of-signal indication indicating non-receipt of an upstream optical signal from an optical network unit or a signal-received indication indicating receipt of the upstream optical signal from the optical network unit. When the signal indication includes the loss-of-signal indication, the method includes instructing enablement and disablement of the optical transceiver to transmit a downstream optical signal to the optical network unit at a threshold rate, resulting in a modulated downstream optical signal including encoded channel information.

This aspect may include one or more of the following optional features. In some implementations, the operations further include, when the signal indication includes the signal-received indication, instructing the optical transceiver to continuously transmit the downstream optical signal from the transceiver to the optical network unit according to the channel information. The encoded channel information may include an x-bit long delimiter segment and a y-bit long channel segment.

Yet another aspect of the disclosure provides a method for establishing communication between an optical line terminal and an optical network unit within an optical access network. The method includes receiving, at data processing hardware, a signal indication from an optical transceiver of an optical network unit and determining, by the data processing hardware, whether the signal indication includes the loss-of-signal indication. The signal indication includes a loss-of-signal indication indicating non-receipt of a downstream optical signal from an optical line terminal or a signal-received indication indicating receipt of the downstream optical signal from the optical line terminal. When the signal indication includes the loss-of-signal indication, the method includes receiving, at the data processing hardware, a modulated downstream optical signal at a threshold bit rate, determining, by the data processing hardware, encoded channel information of the modulated downstream optical signal based on the threshold bit rate, and tuning, by the data processing hardware, the optical transceiver according the encoded channel information.

This aspect may include one or more of the following optional features. In some implementations, the encoded channel information may include an x-bit long delimiter segment and a y-bit long channel segment. Determining the encoded channel information may include rotating the segments of the encoded channel information, identifying the x-bit long delimiter segment, and identifying the y-bit long channel segment as channel information.

Yet another aspect of the disclosure provides an optical network unit including an optical transceiver, data processing hardware in communication with the optical transceiver, and memory hardware in communication with the data processing hardware. The memory hardware stores instructions that when executed on the data processing hardware cause the data processing hardware to perform operations. The operations include receiving a signal indication from the optical transceiver and determining whether the signal indication comprises the loss-of-signal indication. The signal indication includes a loss-of-signal indication indicating non-receipt of a downstream optical signal from an optical line terminal or a signal-received indication indicating receipt of the downstream optical signal from the optical line terminal. When the signal indication includes the loss-of-signal indication, the operations include receiving a modulated downstream optical signal at a threshold bit rate, determining encoded channel information of the modulated downstream optical signal based on the threshold bit rate, and tuning the optical transceiver according the encoded channel information.

This aspect may include one or more of the following optional features. In some implementations, the encoded channel information includes an x-bit long delimiter segment and a y-bit long channel segment. Determining the encoded channel information may include rotating the segments of the encoded channel information, identifying the x-bit long delimiter segment, and identifying the y-bit long channel segment as channel information.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
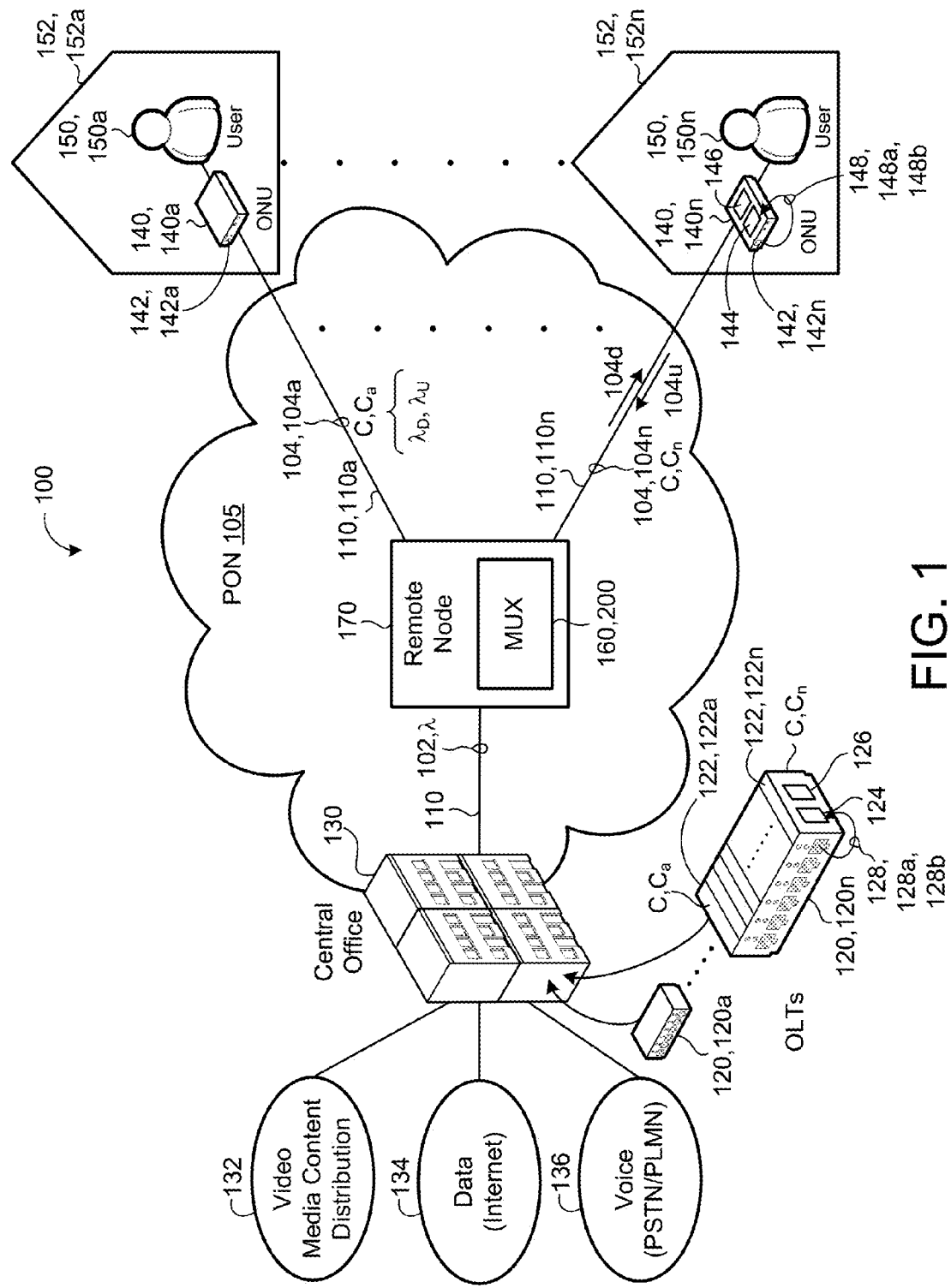
FIG. 1 is a schematic view of an example communication system.

Referring to FIG. 1, a communication system 100 delivers communication signals 102 (e.g., optical signals) through communication links 110, 110a-n (e.g., optical fibers or line-of-sight free space optical communications) between an optical line terminal (OLT) 120 housed in a central office (CO) 130 and optical network units (ONUs) 140, 140a-n (e.g., a bidirectional optical transceiver) associated with users 150, 150a-n (also referred to as customers or subscribers). The ONUs 140, 140a-n are typically located at premises 152, 152a-n of the users 150, 150a-n.

Customer premises equipment (CPE) is any terminal and associated equipment located at the premises 152 of the user 150 and connected to a carrier telecommunication channel C at a demarcation point ("demarc"). In the examples shown, the ONU 140 is a CPE. The demarc is a point established in a house, building, or complex to separate customer equipment from service provider equipment. CPE generally refers to devices such as telephones, routers, switches, residential gateways (RG), set-top boxes, fixed mobile convergence products, home networking adapters, or Internet access gateways that enable the user 150 to access services of a communications service provider and distribute them around the premises 152 of the user 150 via a local area network (LAN).

In some implementations, the optical communication system 100 implements an optical access network 105, such as a passive optical network (PON) 105. In some implementations, the optical communication system 100 implements a point-to-point (pt-2-pt) PON having direct connections, such as optical Ethernets, where a home-run optical link 110 (e.g., fiber) extends all the way back to an OLT 120 at the CO 130 and each customer 30, 30a-n is terminated by a separate OLT 120a-n, as opposed to the shared OLT 120.

The CO 130 includes at least one OLT 120 connecting the optical access network 105 to an Internet Protocol (IP), Asynchronous Transfer Mode (ATM), or Synchronous Optical Networking (SONET) backbone, for example. Therefore, each OLT 120 is an endpoint of the PON 105 and converts between electrical signals used by service provider equipment and optic signals 102 used by the PON 105. The OLT 120 sends the optical signal 102 through a feeder fiber 110 to the remote node 170, which demultiplexes the optical signal 102 and distributes the demulitplexed optical signals 102 to multiple users 150, 150a-n. The multiplexer 160 for multiplexing/demultiplexing splitters may be an arrayed wavelength grating (AWG), which is a passive optical device. In some examples, each CO 130 includes multiple OLTs 120, 120a-n, and each OLT 120 is configured to service a group of users 150. In addition, each OLT 120 may be configured to provide signals in different services, e.g., one OLT 120 may provide services in 1G-PON, while another OLT 120 provides services in 10G-PON.

As shown in FIG. 1, the CO 130 multiplexes signals received from several sources, such as video media distribution 132, Internet data 134, and voice data 136, and multiplexes the received signals into one multiplexed signal 102 before sending the multiplexed optical signal 102 to the remote node 170 through the feeder fiber 110. The multiplexing may be performed by the OLT 120 or a broadband network gateway (BNG) positioned at the CO 130. Typically, services are time-division-multiplexed (TDM) on the packet layer. When the CO 130 includes more than one OLT 120, the signals 102 of multiple OLT 120, 120a-n can be multiplexed to form a wavelength division multiplexed (WDM)) signal for delivery to the remote node 170. Multiplexing combines several input signals and outputs a combined signal.

A Wavelength Division Multiplexing (WDM) PON 105 is a fiber optical network architecture for access and mobile fronthaul/backhaul networks. The WDM-PON 105 uses multiple wavelengths λ to implement point-to-multi-point communications. The OLT 120 serves multiple wavelengths through one fiber 110 to the multiplexer 160 at the remote node 170, which multiplexes/demultiplexes signal between the OLT 120 and a plurality of ONUs 140, 140a-n.

Figure 2A:
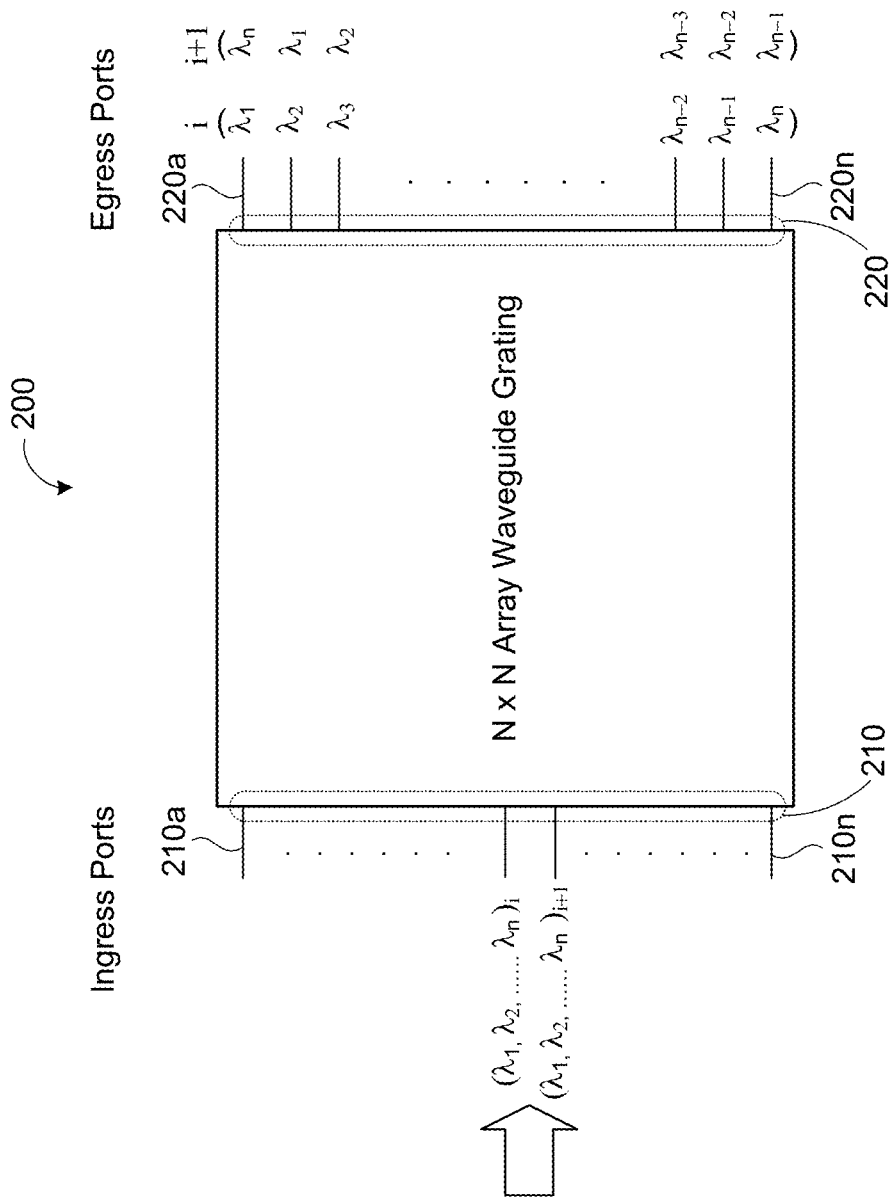
FIGS. 2A and 2B are schematic views of example arrayed waveguide gratings.
Figure 2B:
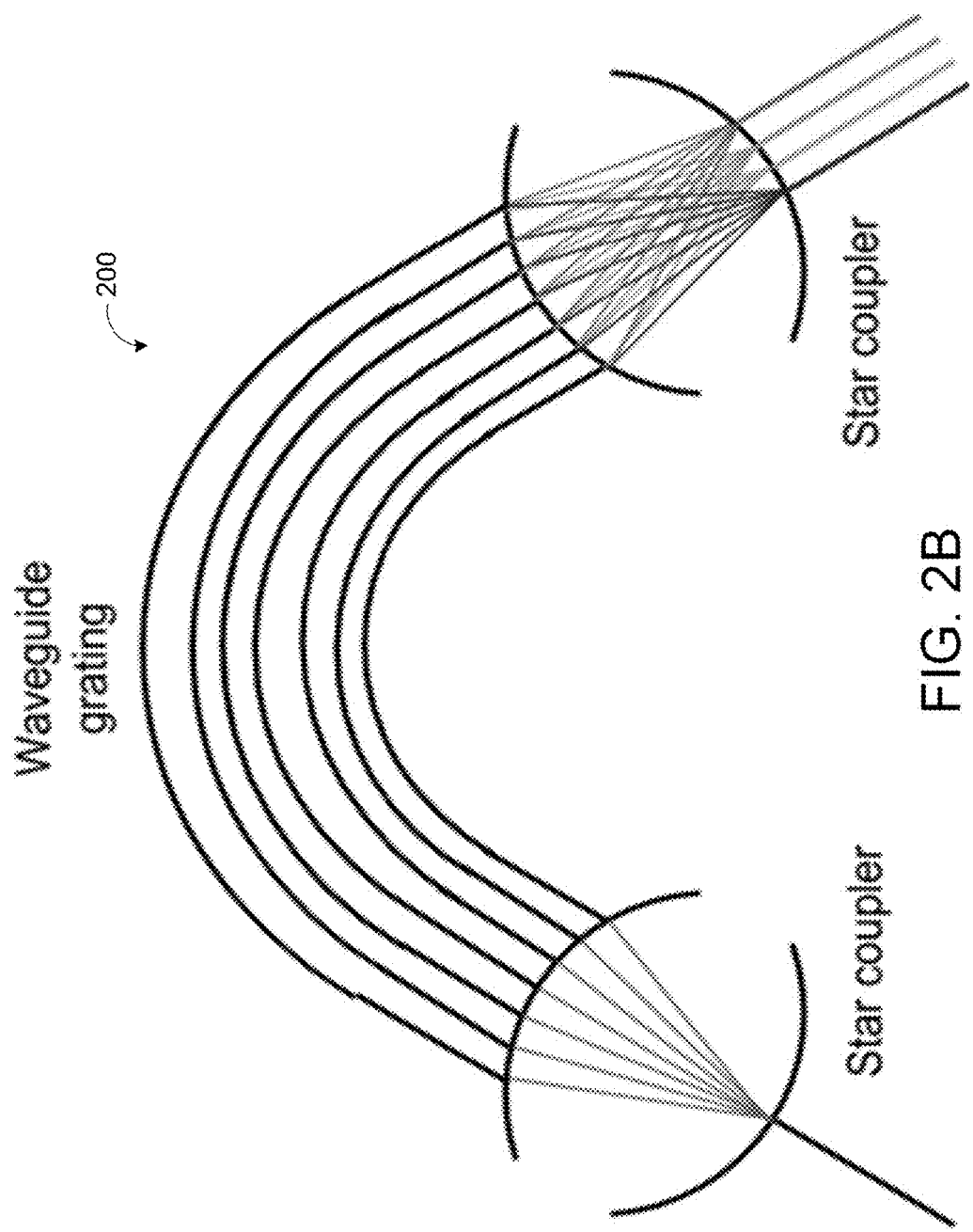

FIGS. 2A and 2B illustrate an exemplary arrayed waveguide grating 200 (AWG), which may be used as a multiplexer 160. An AWG 200 may be used to demultiplex an optical signal in a WDM system. AWGs 200 can multiplex a large number of wavelengths λ into one optical fiber, thus increasing the transmission capacity of optical networks. AWGs 200 can therefore multiplex channels of several wavelengths λ onto a single optical fiber at a transmission end, and reciprocally they can also demultiplex different wavelength channels at the receiving end of an optical access network 105. An AWG 200 is a passive planar light wave circuit device typically used as a wavelength multiplexer and/or demultiplexer. N×N AWGs 200 also have wavelength routing capabilities. If a system has N equally-spaced wavelengths $\lambda_n$, an N×N AWG 200 can be designed with an egress port spacing matching the wavelength spacing. The N×N AWG 200 routes differing wavelengths $\lambda$, $\lambda_{1-n}$ at an ingress port 210, 210a-n to different egress ports 220, 220a-n such that all N wavelengths $\lambda_{1-n}$ are mapped to all N egress ports 220a-n sequentially. The routing of the same N wavelengths $\lambda_{1-n}$ at two consecutive ingress ports 210 have the wavelength mapping shifted by one egress side.

The AWG 200 is cyclic in nature. The wavelength multiplexing and demultiplexing property of the AWG 200 repeats over periods of wavelengths called free spectral range (FSR). Multiple wavelengths, separated by the free spectral range (FSR), are passed down each port 220. Therefore, by utilizing multiple FSR cycles, different tiered services may coexist on the same fiber plant 20, 22.

Referring again to FIG. 1, the OLT 120 includes multiple optical transceivers 122, 122a-n. Each optical transceiver 122 transmits signals at one fixed wavelength $\lambda_D$ (referred to as a downstream wavelength) and receives optical signals 102 at one fixed wavelength $\lambda_U$ (referred to as an upstream wavelength). The downstream and upstream wavelengths $\lambda_D$, $\lambda_U$ may be the same or different. Moreover, a channel C may define a pair of downstream and upstream wavelengths $\lambda_D$, $\lambda_U$, and each optical transceiver 122, 122-n of a corresponding OLT 120 may be assign a unique channel $C_{a-n}$.

The OLT 120 multiplexes/demultiplexes the channels C, $C_{a-n}$ of its optical transceivers 122, 122a-n for communication of an optical signal 102 through the feeder fiber 110. Whereas, the multiplexer 160 at the remote node 170 multiplexes/demultiplexes optical signals 102, 104, 104-n between the OLT 120 and a plurality of ONUs 140, 140a-n. For example, for downstream communications, the multiplexer 160 demultiplexes the optical signal 102 from the OLT 120 into ONU optical signals 104, 104-n for each corresponding ONU 140, 140a-n. For upstream communications, the multiplexer 160 multiplexes ONU optical signals 104, 104-n from each corresponding ONU 140, 140a-n into the optical signal 102 for delivery to the OLT 120. To make the transmission successful, the optical transceivers 122, 122a-n of the OLT 120 match with the ONUs 140, 140-n one-by-one. In other words, the downstream and upstream wavelengths $\lambda_D$, $\lambda_U$ (i.e., the channel C) of a given ONU optical signal 104, 104-n matches the downstream and upstream wavelengths $\lambda_D$, $\lambda_U$ (i.e., the channel C) of a corresponding optical transceiver 122. In some examples, the ONU 140 includes a photodetector that converts the optical wave to an electric form. The electrical signal may be further de-multiplexed down to subcomponents (e.g., data over a network, sound waves converted into currents using microphones and back to its original physical form using speakers, converting images converted into currents using video cameras and converting back to its physical form using a television).

In some implementations, each ONU 140, 140a-n includes a corresponding tunable ONU transceiver 142, 142a-n (e.g., that includes a laser or light emitting diode) that can tune to any or partial wavelength $\lambda$ used by a corresponding OLT 120 at a receiving end. The ONU transceiver 142, 142a-n facilitates easier in-field installation and better inventory management than a fixed wavelength transmitter. When installing an ONU 140, it is desirable to have the ONU 140 automatically tune to a wavelength $\lambda$ that establishes a communication link between the corresponding OLT 120 and the ONU 140.

In some implementations, the automatic wavelength tuning can be implemented above a physical layer. For example, if the OLT 120 and corresponding ONUs 140, 140a-n communicate by Ethernet protocol, the OLT 120 can instruct each transceiver 122, 122a-n to send Ethernet broadcast packets that includes channel information. After receiving the packet, each ONU 140 can: (i) decode the channel information; (ii) self-tune the corresponding ONU transceiver 142 to the downstream and upstream wavelengths $\lambda_D$, $\lambda_U$ of the channel C assigned to the ONU 140 based on the channel information; and (iii) establish bi-directional communication with the corresponding OLT 120. Moreover, the OLT 120 can use other high-level protocols, such as Simple Network Management Protocol (SNMP), Technical Report 069 (TR069), etc. to send the channel information to the ONUs 140, 140a-n. A disadvantage of this solution, however, is that the implementation is tied to the higher-layer protocols. As a result, any protocol change means re-implementing the tuning solution, which may prompt an equipment upgrade or replacement.

In alternative implementations, the OLT 120 implements a tone-based solution that works at the physical layer. In such implementations, the OLT 120 modulates the optical transceivers 122, 122-n with low-frequency tones. The ONUs 140, 140a-n detect the tone frequency and accompanying tone frequency information mapped to the channels C, $C_{a-n}$. This implementation, however, need special circuit to detect the tone and increases the cost of the ONUs 140, 140a-n.

In some implementations, the automatic wavelength tuning can be implemented in the physical layer. The optical transceivers 122 have the capacity to detect whether a received optical signal 102 exists or not and indicate a Loss-Of-signal (LOS) state. LOS is an indicator on a networking device, such as the OLT 120, indicating whether a signal or connection has been dropped or terminated. When LOS is asserted, it means the optical transceiver 122 is not receiving any optical signal 102. The optical transceivers 122 can also enable or disable signal transmission. This control is referred to as Tx Enable and Tx Disable. Firmware of each optical transceiver 122 controls the Tx Enable and Tx Disable functionality and reads the LOS state. Each optical transceiver 122, 142 may include data processing hardware 124, 144 (e.g., circuitry, field programmable gate arrays (FPGAs), etc.) and memory hardware 126, 146 in communication with the data processing hardware 124, 144. The memory hardware 126, 146 may store instructions (e.g., via firmware) that when executed on the data processing hardware 124, 144 cause the data processing hardware 124, 144 to perform operations for auto-tuning the optical transceiver 122, 142.

With continued reference to FIG. 1, in some implementations, an OLT 120 and a corresponding ONU 140 interact with each other to implement auto-tuning of the ONU 140. The OLT 120 may instruct its optical transceiver 122 designated for the ONU 140 to set the Tx Disable to disable transmission of any downstream optical signal 104d to the ONU 140 when the optical transceiver 122 asserts the LOS state. When the optical transceiver 142 of the ONU 140 asserts its LOS state, however, the ONU 140 instructs its optical transceiver 142 to set the Tx Enable and actively switch channels C while transmitting an upstream optical signal 104u. Once the ONU 140 switches to the channel C assigned to the ONU 140 (e.g., the channel C having the downstream and upstream wavelengths $\lambda_D$, $\lambda_U$ assigned to the ONU 140), the optical transceiver 122 of the OLT 120 receives the upstream optical signal 104u and de-asserts its corresponding LOS state. When the OLT 120 determines that its optical transceiver 122 is no longer asserting its LOS state, the OLT 120 instructs its optical transceiver 122 to set Tx Enable and transmit a downstream optical signal 104*d* to the ONU 140. The ONU 140 accepts the downstream optical signal 104*d* and stops channel hunting. At each wavelength λ, the ONU 140 waits a period of time between transmissions long enough for the OLT transceiver 142 to respond to each transmission of the upstream optical signal 104*u*.

In some implementations, the ONU 140 actively switches channel when the optical transceiver 142 asserts the LOS state is asserted, until the optical transceiver 142 accepts the downstream optical signal 104*d* from the OLT 120. A channel switch time of the ONU 140 while channel hunting may be greater than or equal to a sum of T1, T2, T3, T4, T5, and T6, where:

① T1 is a wavelength tuning time until wavelength stability (e.g., about 1 s);
② T2 is RX_LOS time of the ONU 140 (e.g., less than 100 µs);
③ T3 is a response time of a microcontroller 144 of the ONU 140 (e.g., less than 25 ms);
④ T4 is a RX_LOS time of the OLT 120 (e.g., less than 100 us);
⑤ T5 is a TX_Enable time of the OLT 120 (e.g., less than 1 ms); and
⑥ T6 is a light transmission time from the ONU 140 to the OLT 120 and then from the OLT 120 back to the ONU 140 (e.g., less than 1 ms).

An example channel switch time may be about two seconds.

Figure 3:
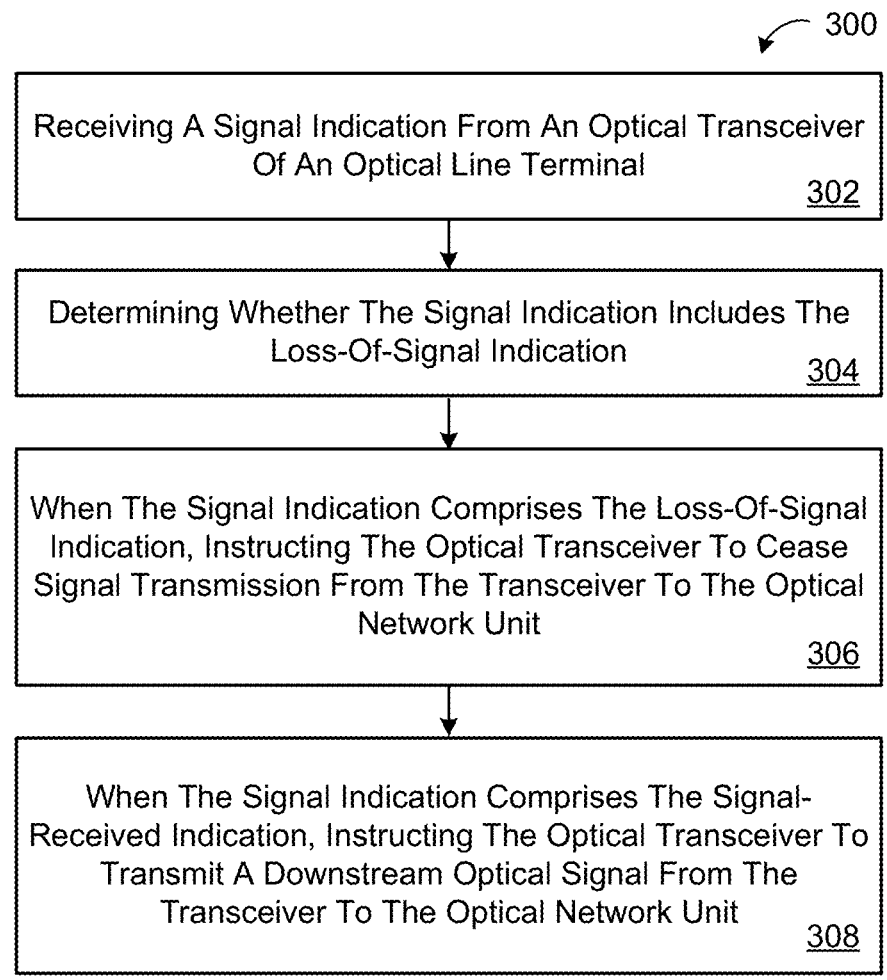
FIGS. 3-6 are schematic views of example arrangements of operations for methods of establishing communication between an optical line terminal and an optical network unit within an optical access network.

FIG. 3 provides an example arrangement of operations for a method 300 of establishing communication between an OLT 120 and an ONU 140 within an optical access network 105. At block 302, the method 300 includes receiving, at data processing hardware 124, a signal indication 148 from an optical transceiver 122 of an OLT 120. The signal indication 128 includes: (i) a loss-of-signal (LOS) indication 128*a* indicating non-receipt of an upstream optical signal 104*u* from the ONU 140; or (ii) a signal-received indication 128*b* indicating receipt of the upstream optical signal 104*u* from the ONU 140. At block 304, the method 300 includes determining, by the data processing hardware 124, whether the signal indication 128 includes the loss-of-signal indication 128*a*. When the signal indication 128 includes the loss-of-signal indication 128*a*, at block 306, the method 300 includes instructing, by the data processing hardware 124, the optical transceiver 122 of the OLT 120 to cease signal transmission to the ONU 140 (e.g., via Tx Disable). At block 308, when the signal indication 128 includes the signal-received indication 128*b*, the method 300 includes instructing, by the data processing hardware 124, the optical transceiver 122 to transmit a downstream optical signal 104*d* to the ONU 140 (e.g., via Tx Enable).

In some implementations, the ONU 140 is configured to recursively transmit the upstream optical signal 104*u* at different wavelengths λ until receipt of the downstream optical signal 104*d*. In some examples, the ONU 140 is configured to recursively transmit the upstream optical signal 104*u* at sequentially different wavelengths λ within a free spectral range. Additionally or alternatively, the ONU 140 may be configured to delay transmission of a subsequent upstream optical signal 104*u* after a prior upstream optical signal 104*u* by a threshold period of time. For example, at each wavelength λ, the ONU 140 waits between transmissions long enough for the optical transceiver 122 of the OLT 120 to respond to the transmission. The upstream optical signal 104*u* and the downstream optical signal 104*d* may have the same or different wavelengths λ.

Figure 4:
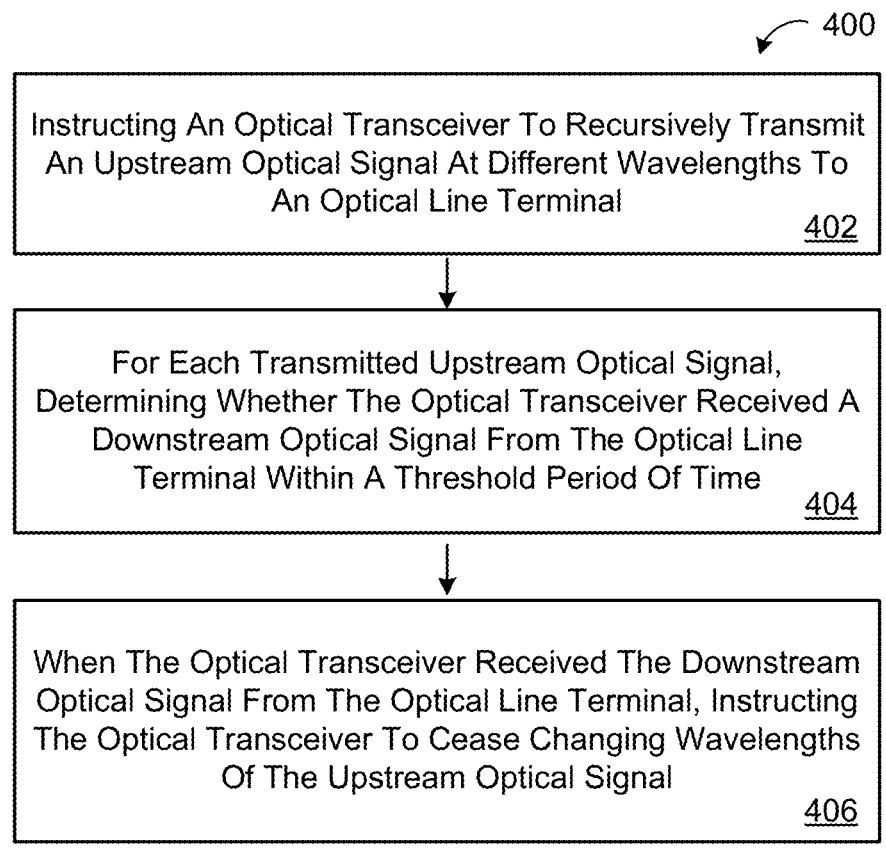

FIG. 4 provides an example arrangement of operations for a method 400 of establishing communication between an OLT 120 and an ONU 140 within an optical access network 105. At block 402, the method 400 includes instructing, by data processing hardware 144, an optical transceiver 142 of an ONU 140 to recursively transmit an upstream optical signal 104*u* at different wavelengths λ to an OLT 120 (e.g., via ONU channel hunting). At block 404, for each transmitted upstream optical signal 104*u*, the method 400 includes determining, by the data processing hardware 144, whether the optical transceiver 142 received a downstream optical signal 104*d* from the OLT 120 within a threshold period of time. At block 406, when the optical transceiver 142 receives the downstream optical signal 104*d* from the OLT 120, the method 400 includes instructing, by data processing hardware 144, the optical transceiver 142 to cease changing wavelengths λ of the upstream optical signal 104*u*. In other words, the ONU 140 accepts the light and stops channel hunting.

In some implementations, instructing the optical transceiver 142 of the ONU 140 to recursively transmit the upstream optical signal 104*u* at different wavelengths λ includes delaying transmission of a subsequent upstream optical signal 104*u* after a prior upstream optical signal 104*u* by a threshold delay. For example, at each wavelength λ, the ONU 140 waits between transmissions long enough for the optical transceiver 122 of the OLT 120 to respond to the transmission. Additionally or alternatively, instructing the optical transceiver 142 of the ONU 140 to recursively transmit the upstream optical signal 104*u* at different wavelengths λ includes transmitting the upstream optical signal 104*u* at sequentially different wavelengths λ within a free spectral range. The upstream optical signal 104*u* and the downstream optical signal 104*d* may have the same or different wavelengths λ. In some examples, the method 400 includes storing in memory hardware 146 at least one of: (i) the wavelength λ of the upstream optical signal 104*u* when the optical transceiver 142 of the ONU 140 received the downstream optical signal 104*d* from the OLT 120; or (ii) the wavelength λ of the downstream optical signal 104*d*.

Referring again to FIG. 1, in some implementations, an OLT 120 and a corresponding ONU 140 interact with each other to implement auto-tuning of the ONU 140 via encoded channel information. The OLT 120 controls the Tx Enable/Tx Disable of the optical transceiver 122 corresponding to the ONU 140 (e.g., via firmware) to modulate transmission of a downstream optical signal 104*d* to the ONU 140. The downstream optical signal 104*d* includes encoded channel information for the channel C assigned to the ONU 140. In some examples, the encoded channel information includes an x-bit long delimiter segment and a y-bit long channel segment.

Encoding and Modulation are two techniques used to provide the means of mapping information or data into different waveforms such that the receiver (with the help of an appropriate demodulator and decoder) can recover the information in a reliable manner. Encoding is the process by which the data is converted into digital format for efficient transmission or storage. Modulation is the process of converting information (signals or data) to an electronic or optical carrier, so that it can be transmitted to comparatively large distance without getting affected by noise or unwanted signals.

The OLT 120 instructs its optical transceiver 122 to transmit the downstream optical signal 104*d* at a slow speed (e.g., 10 bits/s or slower) when the optical transceiver 122 of the OLT 120 asserts the LOS state. The optical transceiver 122 can achieve this by controlling the Tx Enable control through firmware.

In light of the slow transmission speed, the ONU 140 can use a firmware loop there inside to receive the channel information by monitoring the ONU LOS indictor at the same bit rate. After receiving x+y bits, the ONU 140 can rotate the received bits (e.g., via firmware) until the delimiter is identified as the first part of the transmission. The ONU 140 uses the second part of the transmission as channel information and tunes the ONU optical transceiver 142 accordingly. After the ONU 140 self-tunes to the correct channel C (e.g., having the correct downstream and upstream wavelengths $\lambda_D$, $\lambda_U$ assigned to the ONU 140), the ONU 140 sets the Tx Enable and transmits an upstream optical signal 104*u* to the OLT 120. The optical transceiver 122 of the OLT 120 accepts upstream optical signal 104*u* at the correct channel C, thereby causing the OLT 120 to de-assert the LOS state. Once out of the LOS state, the OLT 120 stops the channel signaling and commences normal operation.

Figure 5:
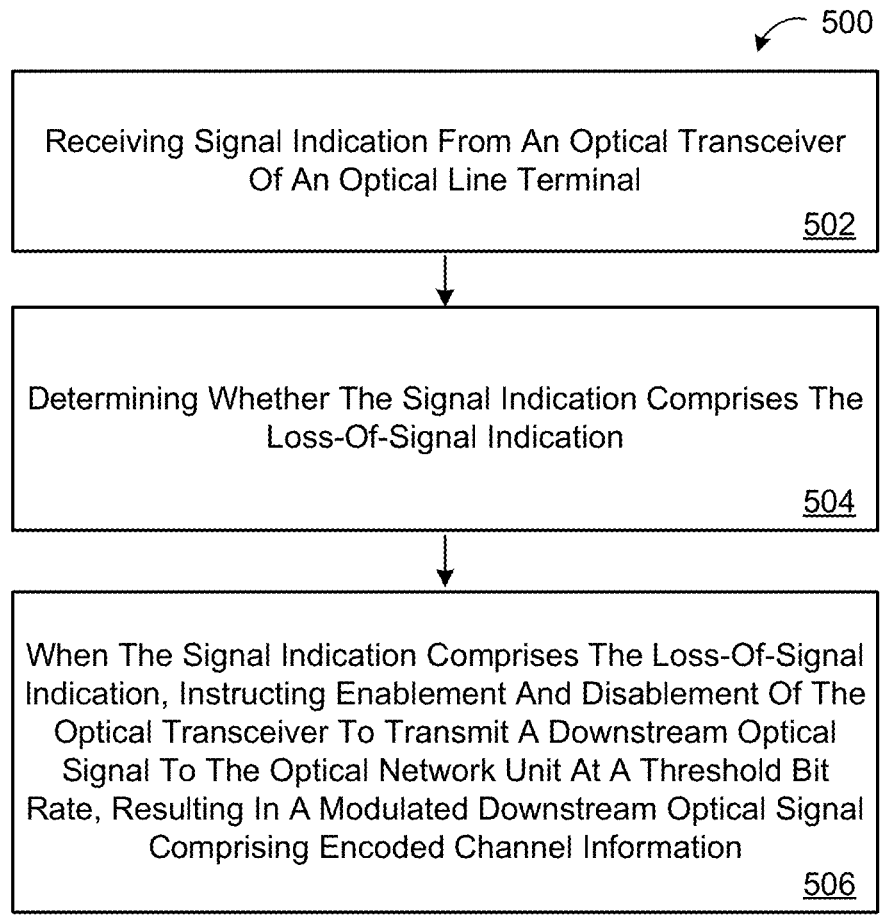

FIG. 5 provides an example arrangement of operations for a method 500 of establishing communication between an OLT 120 and an ONU 140 within an optical access network 105. At block 502, the method 500 includes receiving, at data processing hardware 124, a signal indication 128 from an optical transceiver 122 of an optical line terminal 120. The signal indication 128 includes a loss-of-signal indication 128*a* indicating non-receipt of an upstream signal 104*u* from an optical network unit 140 or a signal-received indication 128*n* indicating receipt of the upstream optical signal 104*u* from the optical network unit 140. At block 504, the method 500 also includes determining, by the data processing hardware, whether the signal indication 128 includes the loss-of-signal indication 128*a*. At block 506, when the signal indication 128 includes the loss-of-signal indication 128*a*, the method 500 includes instructing, by the data processing hardware 124, enablement and disablement of the optical transceiver 122 to transmit a downstream optical signal 104*d* to the optical network unit 140 at a threshold bit rate, resulting in a modulated downstream optical signal 104*d* including encoded channel information.

In some implementations, when the signal indication 128 includes the signal-received indication 128*b*, the method 500 may include instructing, by the data processing hardware 124, the optical transceiver 122 to continuously transmit the downstream optical signal 104*d* from the transceiver 122 to the optical network unit 140 according to the channel information. The encoded channel information may include an x-bit long delimiter segment and a y-bit long channel segment.

Figure 6:
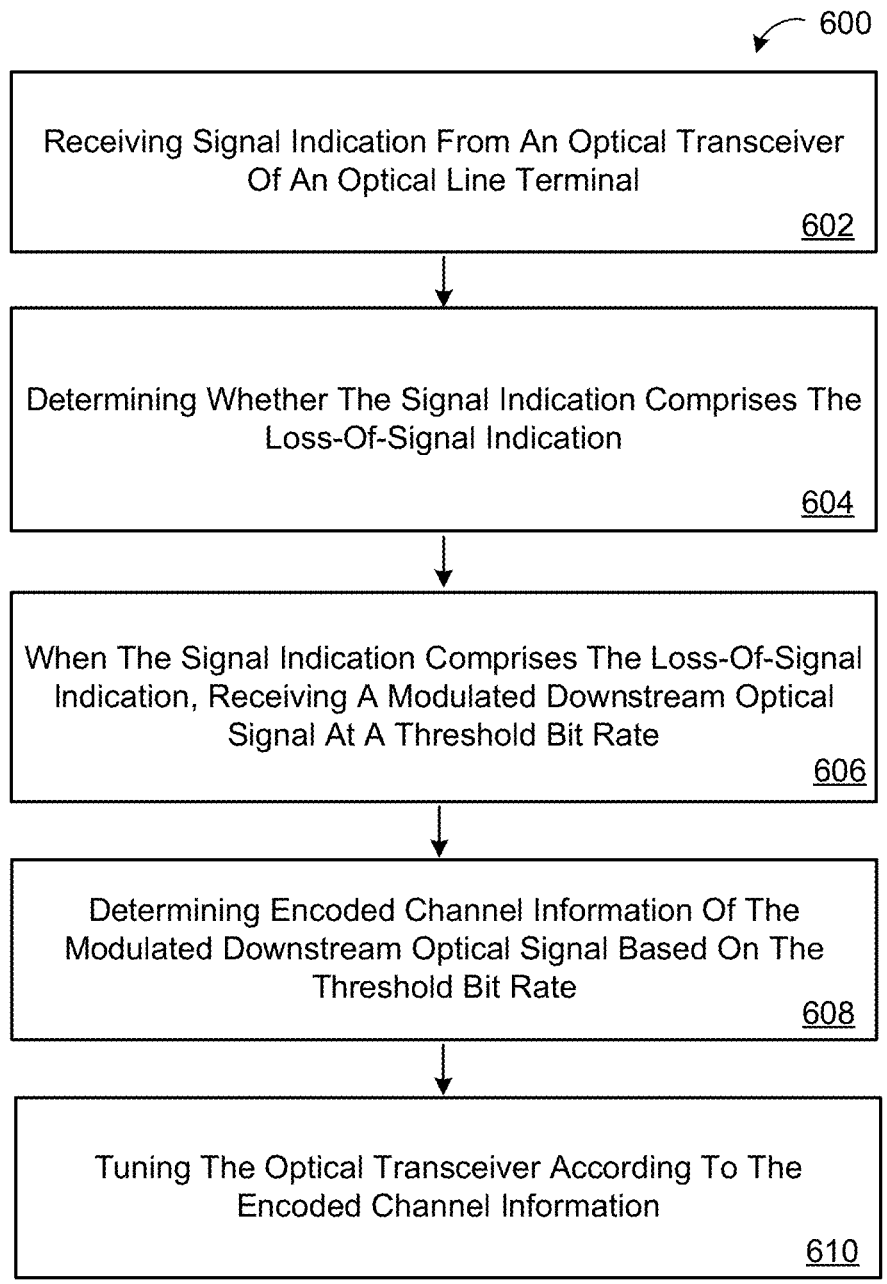

FIG. 6 provides an example arrangement of operations for a method 600 of establishing communication between an OLT 120 and an ONU 140 within an optical access network 105. At block 602, the method includes receiving, at data processing hardware 144, a signal indication 148 from an optical transceiver 142 of an optical network unit 140. At block 604, the method 600 includes determining, by the data processing hardware 144, whether the signal indication 148 includes the loss-of-signal indication 148*a*. The signal indication 148 includes a loss-of-signal indication 148*a* indicating non-receipt of a downstream optical signal 104*d* from an optical line terminal 120 or a signal-received indication 148*b* indicating receipt of the downstream optical signal 104*d* from the optical line terminal 120. At block 606, when the signal indication 148 includes the loss-of-signal indication 148*a*, the method 600 includes receiving, at the data processing hardware 144, a modulated downstream optical signal 104*d* at a threshold bit rate. At block 608, the method 600 includes determining, by the data processing hardware 144, encoded channel information of the modulated downstream optical signal 104*d* based on the threshold bit rate. At block 610, the method 600 includes tuning, by the data processing hardware 144, the optical transceiver 142 according to the encoded channel information.

In some implementations, the encoded channel information may include an x-bit long delimiter segment and a y-bit long channel segment. Determining the encoded channel information may include rotating the segments of the encoded channel information, identifying the x-bit long delimiter segment, and identifying the y-bit long channel segment as channel information.

Figure 7:
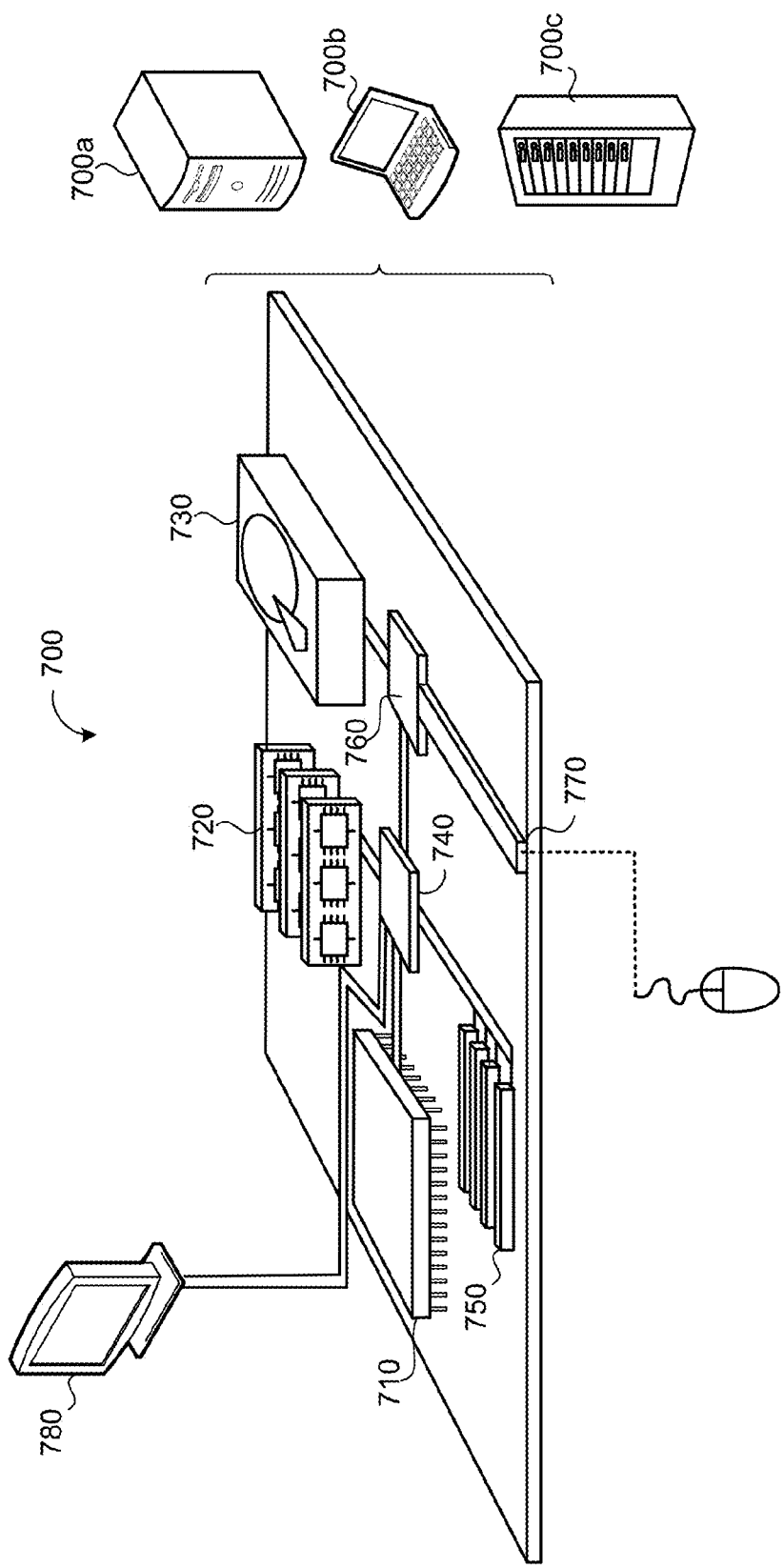
FIG. 7 is schematic view of an example computing device that may be used to implement the systems and methods described in this document.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to low speed bus 770 and storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and low-speed expansion port 770. The low-speed expansion port 770, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    receiving, at data processing hardware, a signal indication from an optical transceiver of an optical line terminal, the signal indication comprising:
        a loss-of-signal indication indicating non-receipt of an upstream optical signal having an upstream wavelength from an optical network unit; or
        a signal-received indication indicating receipt of the upstream optical signal having the upstream wavelength from the optical network unit;
    determining, by the data processing hardware, whether the signal indication comprises the loss-of-signal indication;
    when the signal indication comprises the loss-of-signal indication, instructing, by the data processing hardware, the optical transceiver to cease signal transmission from the optical transceiver to the optical network unit; and when the signal indication comprises the signal-received indication, instructing, by the data processing hardware, the optical transceiver to transmit a downstream optical signal from the optical transceiver to the optical network unit, wherein the optical network unit is configured to recursively transmit the upstream optical signal at different wavelengths until receipt of the downstream optical signal.

2. The method of claim 1, wherein the optical network unit is configured to recursively transmit the upstream optical signal at sequentially different wavelengths within a free spectral range.

3. The method of claim 1, wherein the optical network unit is configured to delay transmission of a subsequent upstream optical signal after a prior upstream optical signal by a threshold period of time.

4. The method of claim 1, wherein the upstream optical signal and the downstream optical signal have different wavelengths.

5. An optical line terminal comprising:

an optical transceiver;

data processing hardware in communication with the optical transceiver; and memory hardware in communication with the data processing hardware, the memory hardware storing instructions that when executed on the data processing hardware cause the data processing hardware to perform operations comprising:

receiving a signal indication from the optical transceiver, the signal indication comprising:

a loss-of-signal indication indicating non-receipt of an upstream optical signal having an upstream wavelength from an optical network unit; or a signal-received indication indicating receipt of the upstream optical signal having the upstream wavelength from the optical network unit;

determining whether the signal indication comprises the loss-of-signal indication;

when the signal indication comprises the loss-of-signal indication, instructing the optical transceiver to cease signal transmission from the optical transceiver to the optical network unit; and when the signal indication comprises the signal-received indication, instructing the optical transceiver to transmit a downstream optical signal from the optical transceiver to the optical network unit, wherein the optical network unit is configured to recursively transmit the upstream optical signal at different wavelengths until receipt of the downstream optical signal.

6. The optical line terminal of claim 5, wherein the optical network unit is configured to delay transmission of a subsequent upstream optical signal after a prior upstream optical signal by a threshold period of time.

7. The optical line terminal of claim 5, wherein the optical network unit is configured to recursively transmit the upstream optical signal at sequentially different wavelengths within a free spectral range.

8. The optical line terminal of claim 5, wherein the upstream optical signal and the downstream optical signal have different wavelengths.

9. A method comprising:

receiving, at data processing hardware, a signal indication from an optical transceiver of an optical line terminal, the signal indication comprising:

a loss-of-signal indication indicating non-receipt of an upstream optical signal having an upstream wavelength from an optical network unit; or a signal-received indication indicating receipt of the upstream optical signal having the upstream wavelength from the optical network unit;

determining, by the data processing hardware, whether the signal indication comprises the loss-of-signal indication;

when the signal indication comprises the loss-of-signal indication, instructing, by the data processing hardware, enablement and disablement of the optical transceiver to transmit a downstream optical signal to the optical network unit at a threshold bit rate, resulting in a modulated downstream optical signal comprising encoded channel information; and when the signal indication comprises the signal-received indication, instructing, by the data processing hardware, the optical transceiver to continuously transmit the downstream optical signal from the transceiver to the optical network unit according to the encoded channel information.

10. The method of claim 9, wherein the encoded channel information comprises an x-bit long delimiter segment and a y-bit long channel segment.

11. An optical line terminal comprising:

an optical transceiver;

data processing hardware in communication with the optical transceiver; and memory hardware in communication with the data processing hardware, the memory hardware storing instructions that when executed on the data processing hardware cause the data processing hardware to perform operations comprising:

receiving a signal indication from the optical transceiver, the signal indication comprising:

a loss-of-signal indication indicating non-receipt of an upstream optical signal having an upstream wavelength from an optical network unit; or a signal-received indication indicating receipt of the upstream optical signal having the upstream wavelength from the optical network unit;

determining whether the signal indication comprises the loss-of-signal indication;

when the signal indication comprises the loss-of-signal indication, instructing, by the data processing hardware, enablement and disablement of the optical transceiver to transmit a downstream optical signal to the optical network unit at a threshold bit rate, resulting in a modulated downstream optical signal comprising encoded channel information; and wherein the operations further comprise, when the signal indication comprises the signal-received indication, instructing the optical transceiver to continuously transmit the downstream optical signal from the transceiver to the optical network unit according to the encoded channel information.

12. The optical line terminal of claim 11, wherein the encoded channel information comprises an x-bit long delimiter segment and a y-bit long channel segment.

* * * * *